United States Patent [19]

Chu

[11] 4,394,539
[45] Jul. 19, 1983

[54] TIMEPIECE WITH AUTOMATIC TIME SETTING SYSTEM THRU DIAL TELEPHONE LINE AND AUTOMATIC SPEED ADJUSTING SYSTEM

[76] Inventor: Tsan-chen Chu, 31-2, Alley 5, Lane 100, Tun Hua S. Rd., Taipei, Taiwan

[21] Appl. No.: 247,013

[22] Filed: Mar. 24, 1981

[51] Int. Cl.³ .......................................... H04M 11/00
[52] U.S. Cl. ................................. 179/2 TC; 179/2 A; 179/1 SD; 368/4
[58] Field of Search ................ 179/2 TC, 2 A, 2 AM, 179/1 SB, 1 Sd, 6.04, 6.07; 368/4, 13, 55

[56] References Cited

U.S. PATENT DOCUMENTS 3,943,288 3/1976 Reed et al. ........................ 179/2 TC
4,020,628 5/1977 Vittoz ............................ 179/2 TC X
4,125,993 11/1978 Emile, Jr. ..................... 179/2 TC X

FOREIGN PATENT DOCUMENTS 55-2927 1/1980 Japan ..................................... 368/55

Primary Examiner—G. Z. Rubinson
Assistant Examiner—W. J. Brady
Attorney, Agent, or Firm—Holman & Stern

[57] ABSTRACT

A timepiece with automatic time setting and speed adjusting system can, thru the dial telephone line, call the standard time repeat station to check the standard telephone system standard time. When receiving the time announcement signals from the time repeat station, a separation circuit and a voice signal identification circuit pick up the time calibration signal to calibrate the time and adjust the speed of the timepiece automatically. At the same time, a time differential signal is transmitted to the automatic dialing circuit to connect to the telephone line and store the time to a memory circuit to permit dialing the time repeat station again to process the automatic time setting system and automatic speed adjusting system. In addition, the timepiece is connected to several secondary timepieces which have a simple mechanism and circuit structure so as to assure that there will be no time variation with this invention.

4 Claims, 14 Drawing Figures

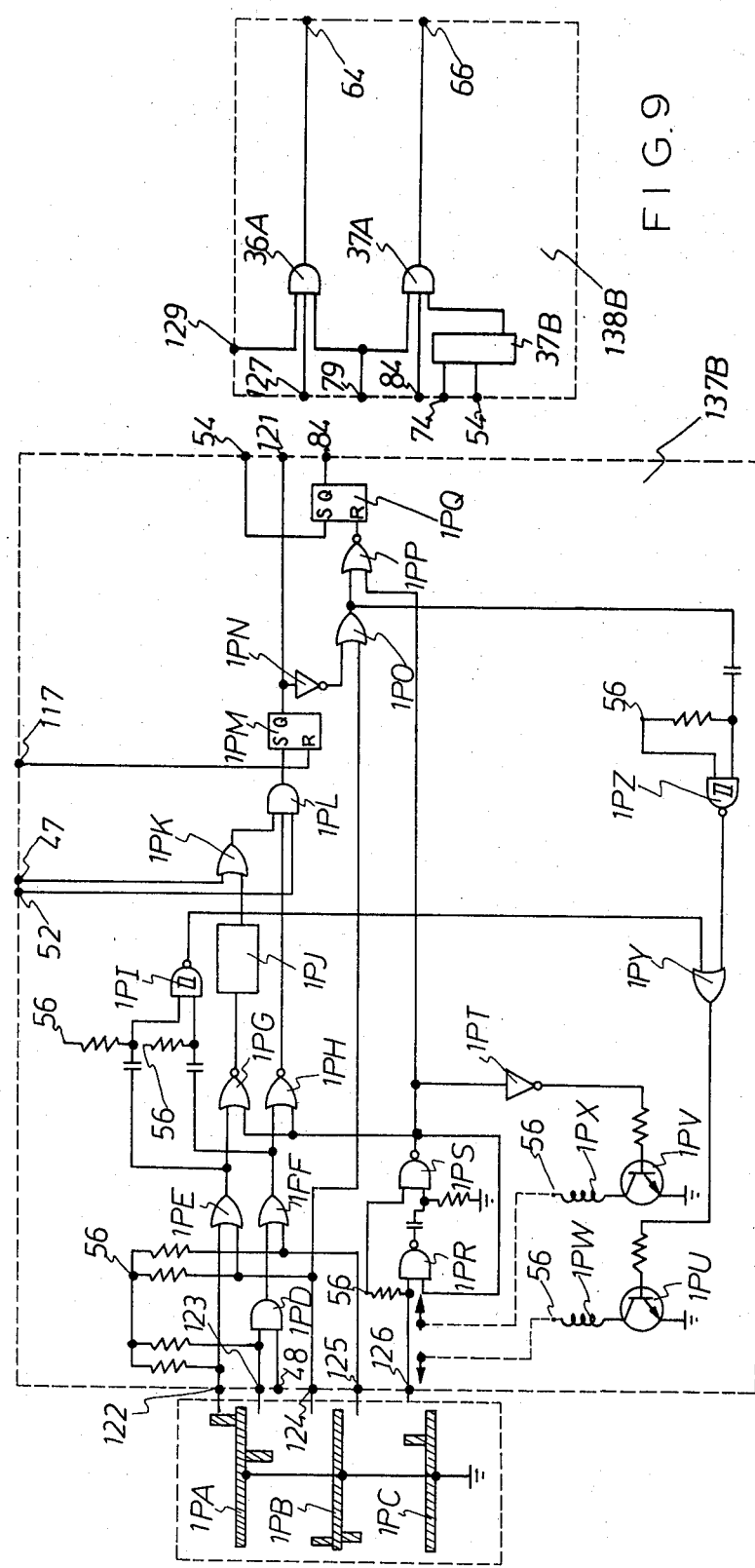

TIMEPIECE WITH AUTOMATIC TIME SETTING SYSTEM THRU DIAL TELEPHONE LINE AND AUTOMATIC SPEED ADJUSTING SYSTEM

BRIEF SUMMARY OF THE INVENTION

This invention provides a timepiece with automatic time setting system thru a dial delephone line and automatic speed adjusting system; it comprises a "primary timepiece" and a "secondary timepiece". Before the time calibration takes place, the primary timepiece select a suitable time to dial the telephone manner of the telephone time repeat station. The system can identify the announced time information. As soon as the predetermined time repeat signal is received, the primary timepiece and secondary timepiece automatically calibrate the standard time; simultaneously, the two timepieces count their time differences respective, and automatically adjust the speed. Therefore a timepiece system having no time variation from standard time is provided by this invention.

BRIEF DESCRIPTION OF THE DRAWINGS

FIG. 8 shows the interface circuit diagram of this invention being used with the hand timepiece.

FIG. 9 shows the time calibration control circuit of this invention being used with the central hand timepiece.

DETAILED DESCRIPTION

As the Chinese proverb says, "One inch of time is equal to one inch of gold." It means that time is a valuable resource of mankind. Unfortunately, a timepiece itself is liable to have some tolerance and to be slow or fast from time to time, although it has been used by mankind as a common standard of time. As a result of the said time tolerance in a region, many mistakes may be caused by the people of that region. For instance, a company, a factory, or a railroad station should have a standard time to be observed by all persons working in that area; even a family should also have a standard timepiece which can automatically calibrate the standard time and can automatically adjust its mechanism so as to keep the timepiece always within an acceptable tolerance. In view of the aforesaid facts, I have developed a timepiece system which has the following special features;

(A) Prior to calibrating the time setting calibration time set, it automatically and non-periodically calls the time repeat station by dialing on the telephone line.

(B) It automatically calibrates its time setting to the announcement of the time repeat station so as to keep its time always the same as that of the time repeat station.

(C) According to the difference between the time repeat station time, and the timepiece setting, this timepiece automatically adjusts its running speed so as to keep the time difference to a minimum.

(D) Within a time tolerance of positive or negative 25 minutes, the said timepiece can automatically calibrate itself and adjust its speed.

(E) In order to minimize the time of occupying the telephone line, the said timepiece can adjust the starting time of occupying telephone line automatically by using the time difference.

(F) The time duration between each time calibration and speed adjustment may be determined at the option of the user; for instance, it can be adjusted to everyday, every hour, or any time length required.

(G) By means of a separating circuit for the time repeat signal and voice signal, the time repeat signal and the voice signal are identified by the silent intervals between adjacent syllables; and by means of a voice signal discrimination circuit, the time calibration signal can be identified by the number of syllables it contains and the time calibration signal can process the automatic time calibration and speed adjustment operations.

(H) The primary timepiece can be simply connected to several secondary timepieces which can thereby be calibrated to the standard time with the single telephone line and have their speeds adjusted at the same time; consequently, each timepiece will be in synchronously related both time and in speed.

(I) This invention can be used for digit timepiece or hand timepiece.

(J) This invention can be used with a timepiece using AC power supply, DC battery, or mechanical spring.

Figure 1:
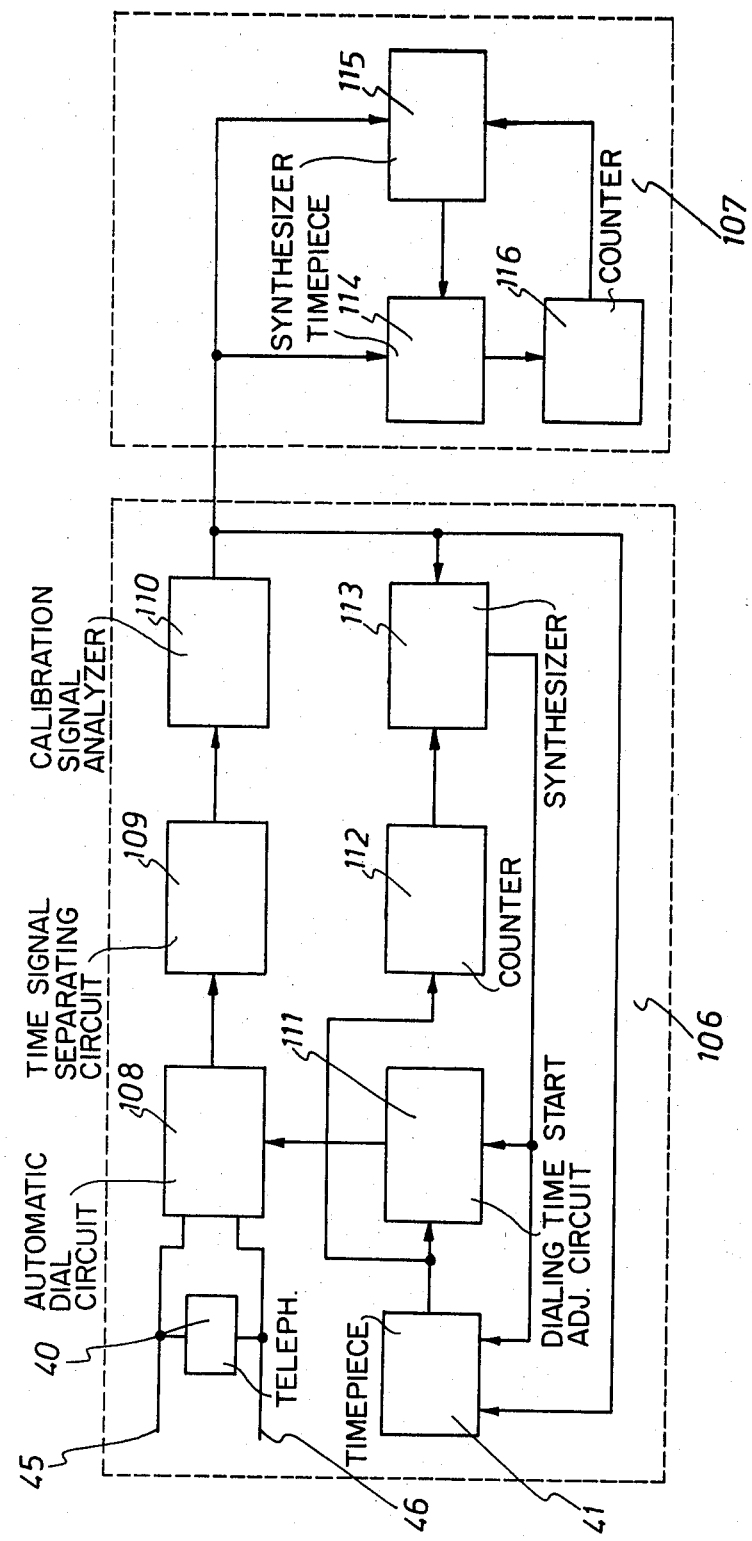
FIG. 1 shows a system block diagram of this invention.
Figure 2:
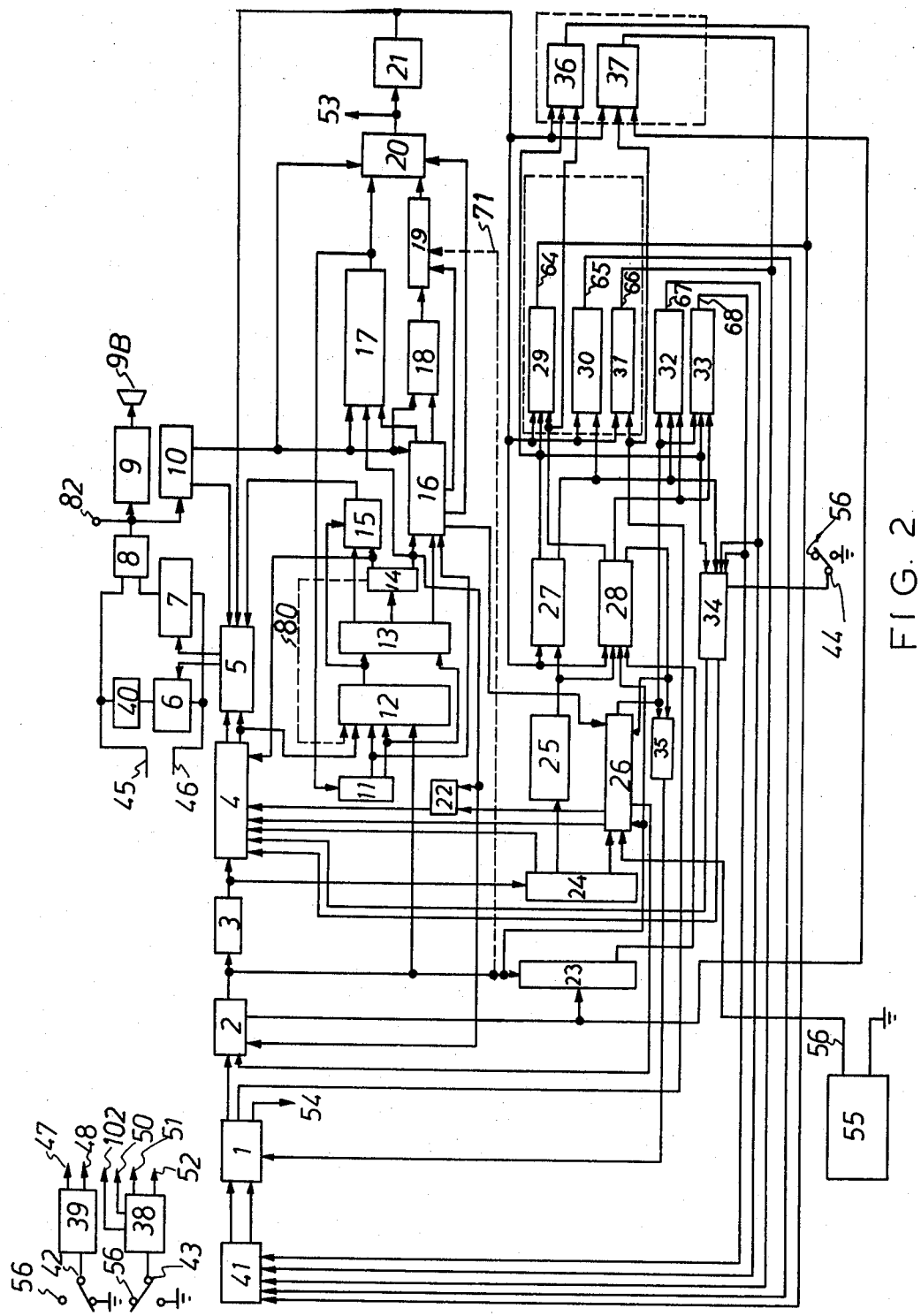
FIG. 2 shows a block diagram of the primary timepiece of embodiment No. 1 of this invention.

FIGS. 1 and 2 show block diagrams being used for the primary timepieces in this invention. The said circuits can be used together with a digit timepiece or a hand timepiece, or a mechanical spring timepiece 41. A system block diagram of this invention is shown in FIG. 1, which comprises the primary timepiece 106 and the secondary timepiece 107. Further, the said primary timepiece 106 comprises automaic dial circuit 108, separating circuit for time repeat signal and voice signal 109, voice signal identifying and time calibration signal analyzing circuit 110, conventional timepiece 41, telephone line switching circuit and automatic dialing starting time adjusting circuit 111, the timepiece synchronous time counting circuit 112, and time differential signal synthetic circuit 113. The secondary timepiece 107 comprises the conventional timepiece 114, the time differential signal synthesizer circuit 115, and the timepiece synchronous time counting circuit 116.

Figure 3:
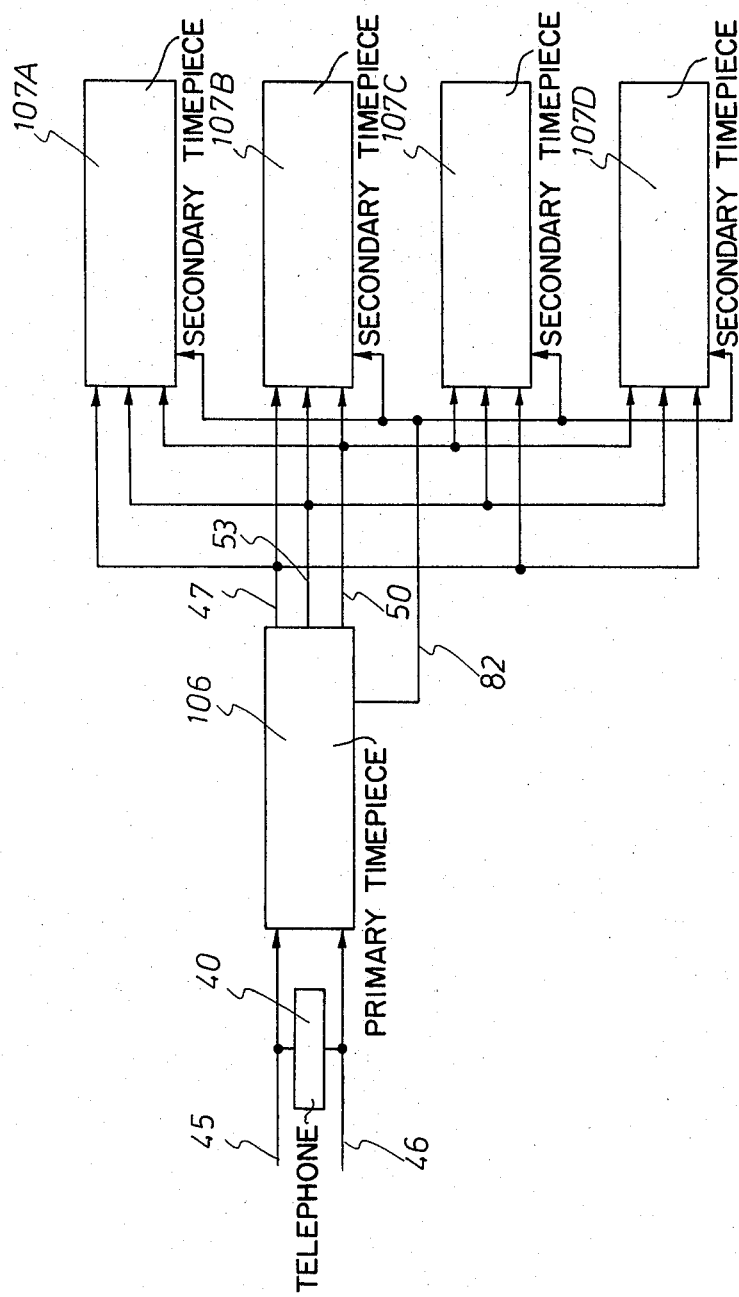
FIG. 3 shows the system connection diagram between the primary timepiece and the secondary timepiece of embodiment No. 1 of this invention.

FIG. 3 is a block diagram of the whole system of a first embodiment of this invention, in which the primary timepiece 106 block diagram comprises, as shown in FIG. 2, conventional timepiece 41, interface circuit 1, oscillation circuit 2, divider 3, telephone line switching circuit and automatic dialing starting time adjusting circuit 4, telephone line monitor circuit 5, telephone set separation circuit 6, telephone line switching and dialing circuit 7, audio frequency amplifier 8, audio frequency separation and amplification circuit 9, speaker 9B, syllable generating circuit 10, differential circuit 11, switch 12, dialing pulse and syllable interval timing circuit 13, switching circuit 14, dialing pulse generating circuit 15, telephone time signal and voice signal separating circuit 16, time signal output circuit 17, voice signal output circuit 18, voice signal discrimination circuit 19, time signal analyzing circuit 20, signal resetting circuit 22, time signal output circuit 21, frequency selection switch circuit 23, synchronization timing circuit 24, time signal output circuit 25, system trouble monitor circuit 26, time difference advance/lag discrimination circuit 27, time differences count circuit 28, the circuit 29 of stopping (holding) signal output, "zero" second setting (seconds and 10's of seconds reset to zero) differential signal output circuit 30, fast set control signal output circuit 31, speed increasing control signal output circuit 32, speed reducing control signal output circuit 33, divider 34, time delay circuit 35, stopping signal output circuit 36, second hand fast rotating signal output circuit 37, time repeat monitor circuit 38, time calibration frequency selection circuit 39, telephone 40, power supply circuit 55, and switches 42, 43, & 44.

Figure 13:
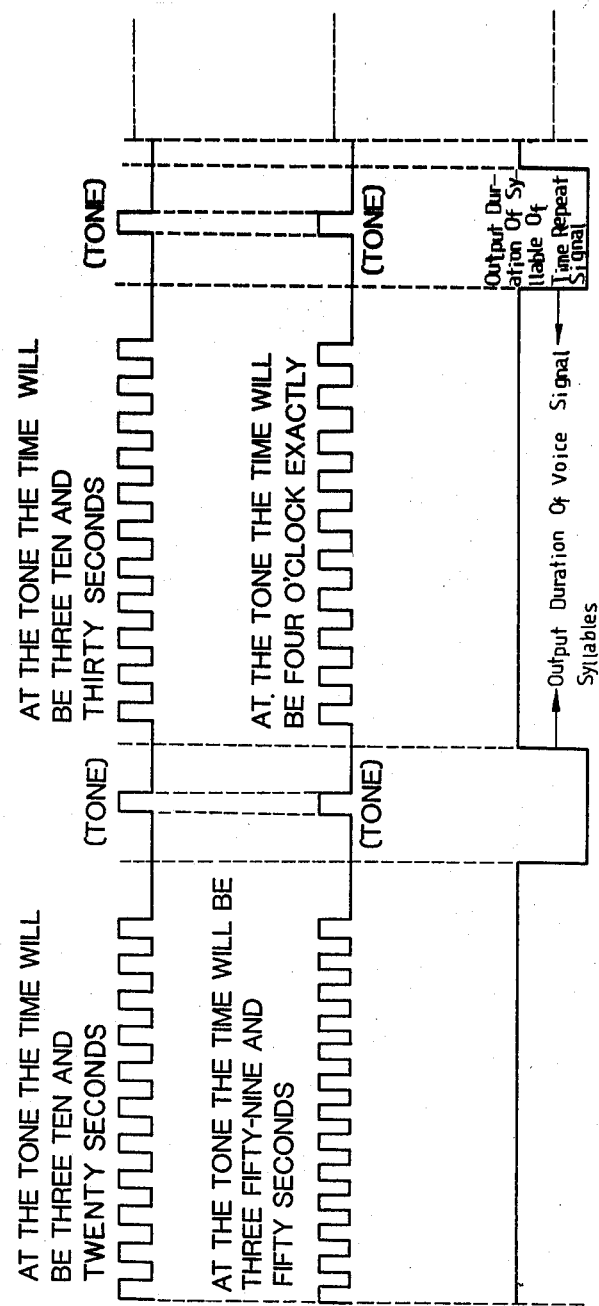
FIG. 13 shows the timing diagram of a Chinese type time repeat system and time repeat signal syllable.

The circuit and theory of the primary timepiece as shown in the first embodiment are explained as follows:

1. Analysis of the characteristics of telephone time repeat system:
   (1). FIG. 13 shows the Chinese type of telephone time repeat system and the syllable of time repeat signal; thru the syllable of FIG. 13, some characteristics may be analyzed as follows:
      (A) Between the syllable of time repeat signal (Du . . . ) and the adjacent syllables, there is a longer silent interval, while there is no such condition existing in other voice syllables. In the circuit of primary timepiece as shown in the first embodiment, this characteristic is used for separating the time repeat signal and the voice signal.
      (B). From 10 minutes and 20 seconds past every hour thru 59 minutes and 50 seconds before every hour (from 10:10 and 20 seconds thru 10:59 and 50 seconds), the number of voice syllables generated every 10 seconds generated is more than that generated during the time of zero minute and zero second of next hour (For example, during the period from 3:10 and 20 seconds thru 3:59 and 50 seconds, the voice syllables generated every 10 seconds are more than ten each, but at 4:00 sharp, the voice syllables generated are reduced to ten suddenly.

Therefore, when this invention is used with the Chinese type of telephone time repeat system, the time selected for time calibration is at zero minute and second of every hour (It is better to select a moment in the early morning, during which the telephone line is not busy and almost everyone is in deep sleep). By the same token, the time repeat signal at "zero minute and zero second" is picked up from the circuit of the primary timepiece as shown in the first embodiment in accordance with the number of voice syllables, and is used as a reference signal. The system mentioned above is good for use in countries in which the syllable is clear, or one word having one syllable, such as China, Japan, and Korea, etc. The first embodiment is good for the Chinese type of time repeat system, and its explanation is based on a design set at 04:00 AM.

Figure 14:
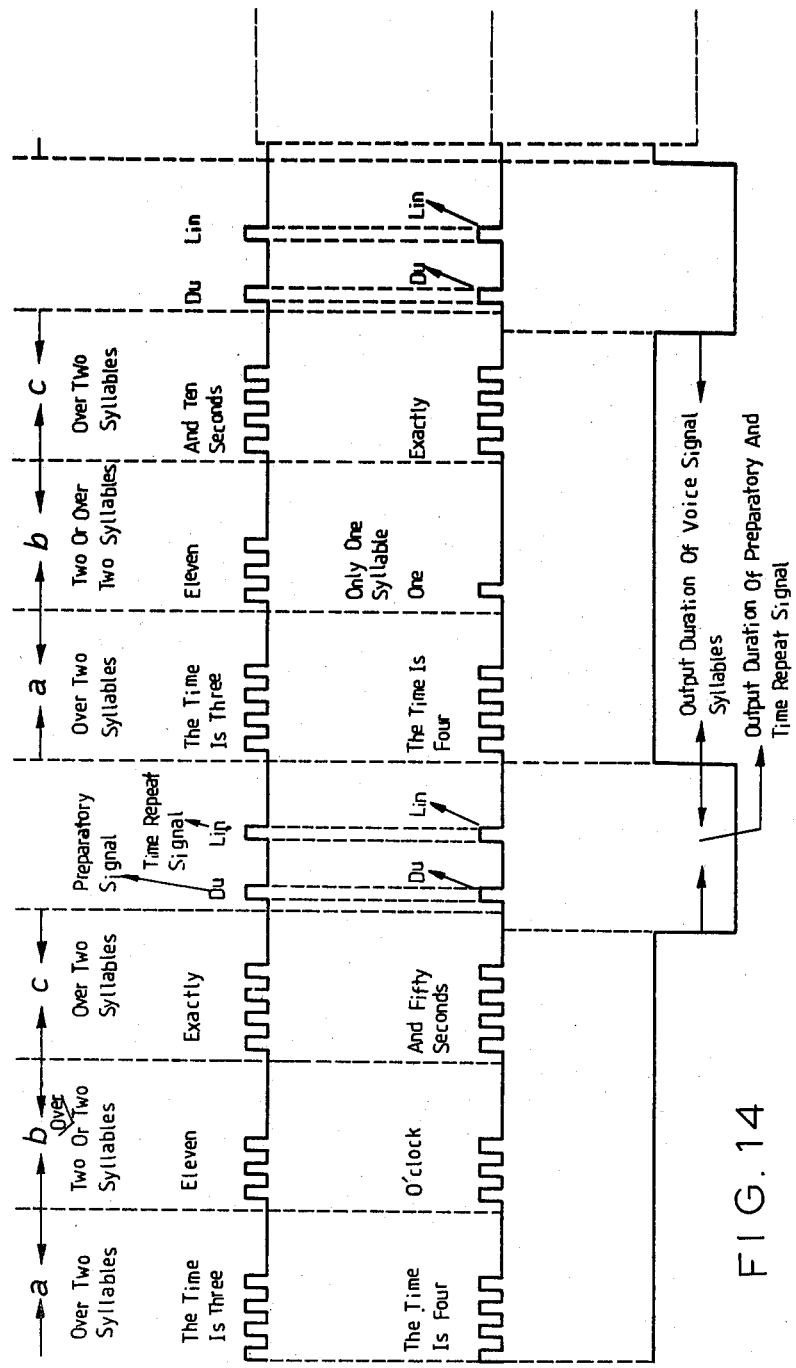
FIG. 14 shows the timing diagram of an American type time repeat system and time repeat signal syllable.

(2). FIG. 14 shows the American type of telephone time repeat system and the syllable of time repeat signal; thru the syllable of FIG. 14, some characteristics may be analyzed as follows:
      (A). Between the preparatory signal (Du . . .), the time repeat signal (Lin . . .) and the adjacent syllable, ther is a longer silent interval, while there is no such condition existing in other voice signal syllables. In the primary timepiece circuit as shown in the first embodiment, this characteristic is used for separating the time repeat signal (including the preparatory signal) and the voice signal.
      (B). The voice signal appears in a, b, c syllable groups, and between the said syllable groups, there is a longer silent interval; in the syllable groups "a" and "c", there are at least two or mre syllables, while in the syllable group "b", there is one, or two, or more than two syllables.

From 11 minutes and zero second passed every hour thru zero minute and 50 seconds of next hour, there are two or more than two voice syllables appearing in syllable group "b" every 10 seconds; then, at one minute and zero second, the number of voice syllable is suddenly reduced to one syllable (i.e., during this time, there is only one syllable in between the two long silent intervals). When this invention is used for Americal type of time repeat system, the calibration time is designed to set at one minute and zero second of any hour (However, it is better to select a moment in the early morning, during which the telephone line is not busy and almost everyone is in deep sleep). Consequently, the time repeat signal at "one minute and zero second" is picked up (to by pass the preparatory signal first) in accordance with the number of syllables appeared in the aforesaid syllable group "b" as shown in the circuit of the primary timepiece in the first embodiment, and will be used as a reference signal. The system mentioned in (2) above is good for the time repeat system in all Teuton or Latin language countries, such as the United States, European countries, etc. The first embodiment is good for the American type of time repeat system, and its explanation is based on a design set at 04:01 and zero second AM (it may be set at any suitable time).

2. Referring to FIGS. 4–7 when the circuit of the primary timepiece in the first embodiment is in the normal stable state, the Q output terminal of each the NOR R/S LATCH is LOW except for 1J, 14A, 26H, 1PQ, 14AA which are all HIGH.

3. The conventional timepiece 41 will, at 03:00 AM, have a HIGH output pulse, which will, thru the lead wire 118 and the AND GATE 1A, change the LOW output of the Q terminal of NOR R/S LATCH 1B to HIGH. When conventional timepiece 41 is at 03:58 (it may be set at a time other than the aforesaid time; if the time is set at 03:35, the maximum time tolerance difference will be about ±25 minutes), it will generate another HIGH output pulse, which will, thru lead-in wire 119 and the AND GATE 1E, change the LOW Q output of NOR R/S LATCH 1I to HIGH; then, thru lead wire 121, OR GATE 1N, AND GATE 2C, and OR GATE 2D, the pulse causes the OSC, comprising SCHMITT TRIGGER 2E and 2H, to start to oscillate, and the said two trigger circuits generate their outputs thru the INVERTERS 2F and 2G, respectively. The circuit of SCHMITT TRIGGER 2E is a non-equilibrium square wave OSC. of 10 HZ, and each cycle of its HIGH output takes 67 ms., while each cycle of LOW output takes 33 ms. on the contrary, the circuit of SCHMITT TRIGGER 2H is an equilibrium square wave OSC. of 240 HZ (for more details, see FIG. 4).

Figure 4:
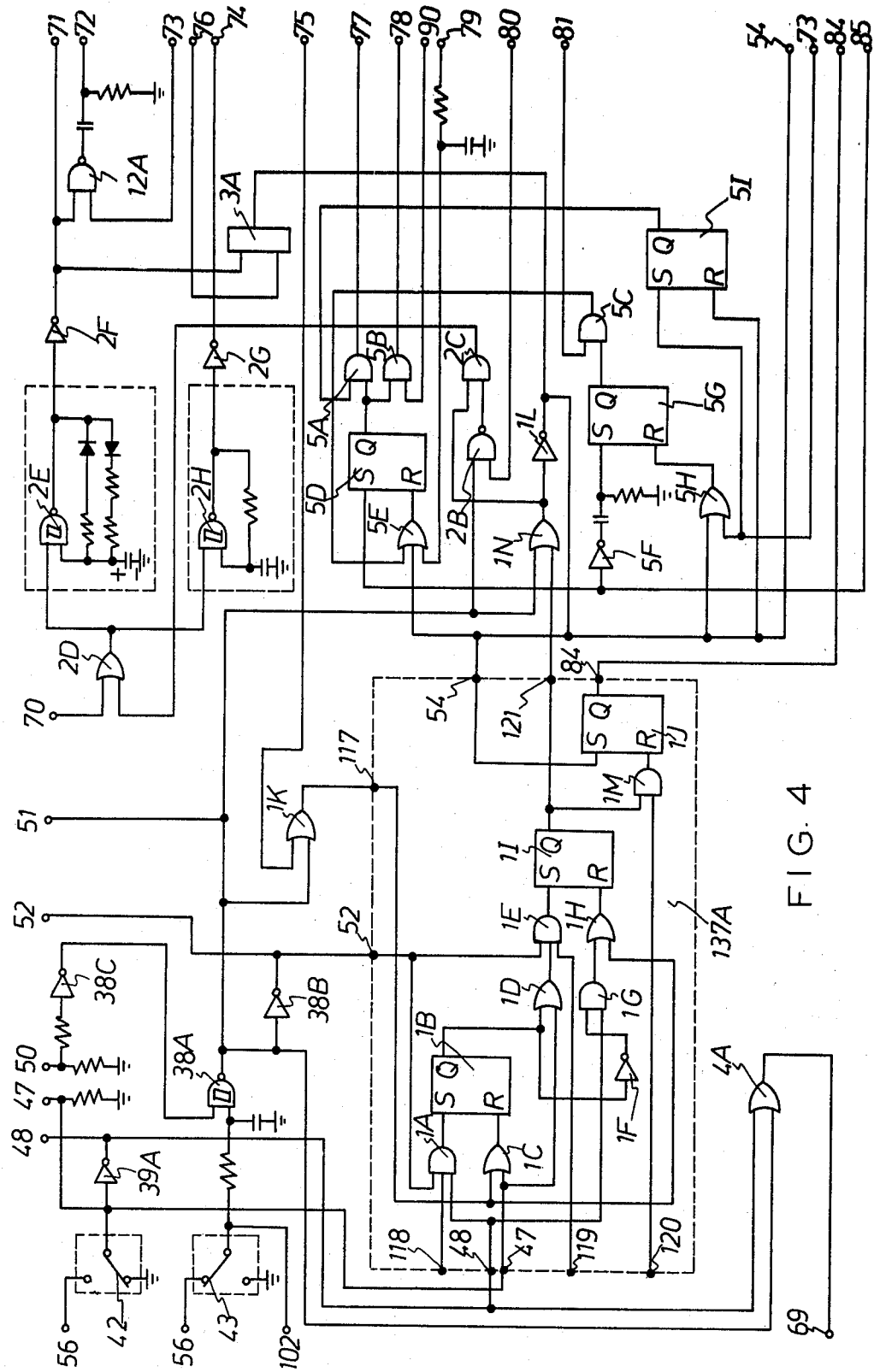
FIGS. 4, 5, 6, and 7 show the embodiments of the circuit diagrams of the primary timepiece of this invention.
Figure 7:
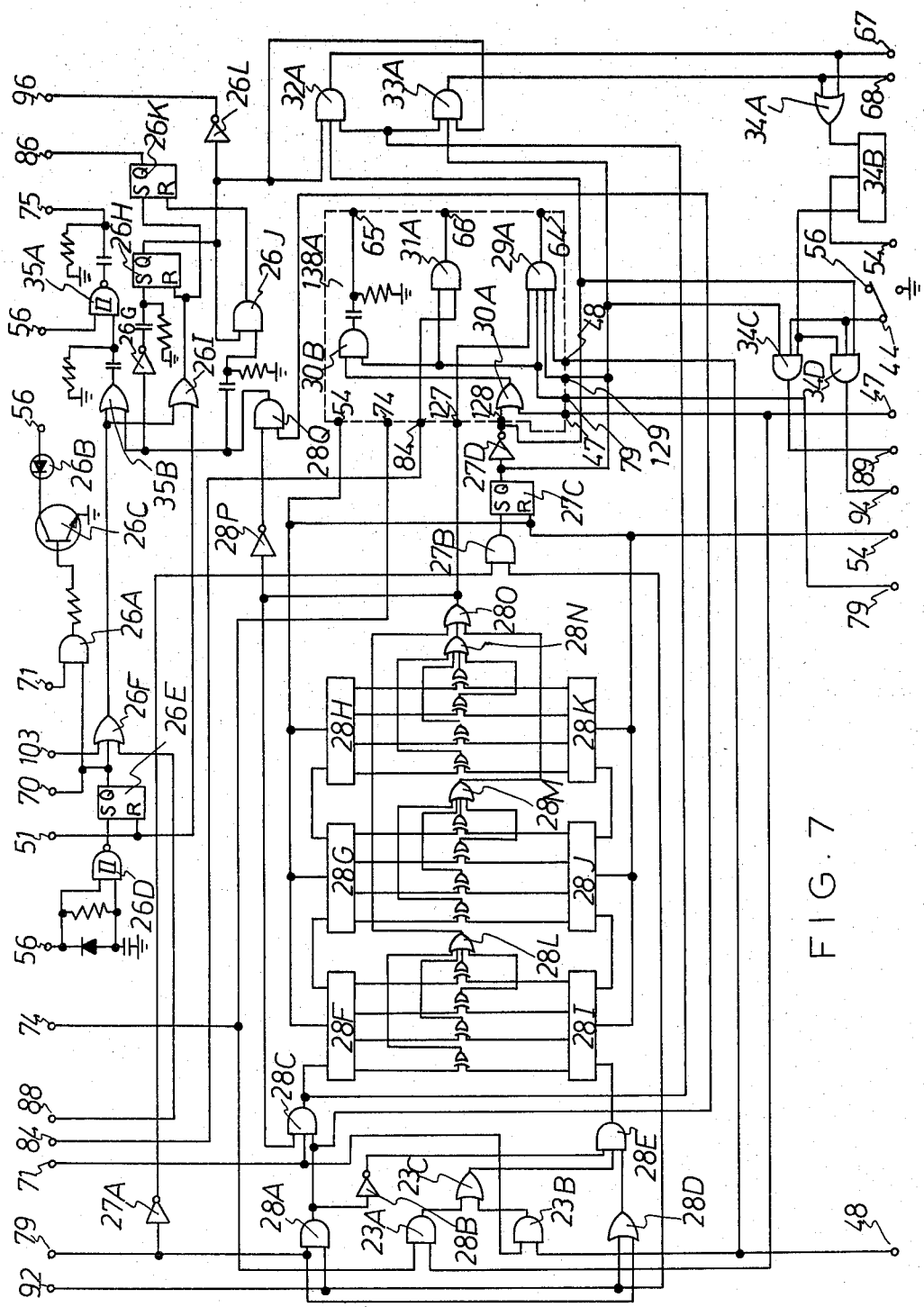

If the timepiece is a hand type, the dotted line portion 137A in FIG. 4 and 138A in FIG. 7 should be replaced with the dotted line portion 137B of FIG. 8 the portion 138B of FIG. 9, and the rest of the circuits remain unchanged. FIG. 8 is the interface circuit being used together with the general hand type timepiece in the first embodiment of this invention, in which 1PA is the hour wheel, and 1PB is the minute wheel, and on each side of the upper and lower edge of said wheel, a pin is installed; 1PC is the second wheel, of which on the upper edge, a pin is installed. When the said upper three pins of three wheels are superimposed on one straight line, the time would be 00:00 hour, or 12:00. When the pins under the hour wheel and the minute wheel, and the pin on the second wheel are superimposed on one straight line, the time would be 03:58 and zero second (it may be set at a differrent time). The diameter of pins on the hour wheel and the minute wheel is bigger than that of the pin on the second wheels; the said three wheels are all grounded. The lead wires (122, 123, 124, and 125) are all made of fine steel wire having elasticity, and are all attached on a fixed position. When the hour wheel and the minute wheel rotate to the straight line between the lead-in wire and the wheel axle, the lead-in wire will touch the pin. The lead wire 126, made of fine steel wire with elasticity, can be moved forwards and backwards; when the circuit is in stable state, the said lead wire is at its rear position and will not touch the pin of the second wheel. When the pin of the second wheel is rotating to the straight line between the lead wire and the wheel axle, and when the said lead wire is moved to its front position, the lead wire will touch the said pin immediately.

When the upper pins of the hour wheel, the minute wheel and the second wheel are almost supeimpoded on a straight line, the pins of the hour wheel and minute wheel will first touch the lead wires 122, 124 because of the diameter of said pins is bigger than that of the pin of the second wheel; then, the OR GATE 1PE will have a LOW output, which will, thru the differential circuit and SCHMITT TRIGGER 1PI, have a pulse output, and the said pulse will go thru OR GATE 1PY, TRANSISTOR 1PU, and the relay 1PW to cause the lead-in wire 126 to move forwards. When the said three pins are superimposed on a straight line, the pin of second wheel will touch the lead wire 126. If the aforesaid touching moment is at 00:00 hour, the NAND GATE 1PS will have a negative output pulse, which will, thru NOR GATE 1PG, cause the T FLIP/FLOP 1PJ to have a HIGH output so as to change PM into AM. AT the same time, the said negative pulse will go thru INVERTER 1PT. TRANSISTOR 1PV and relay 1PX to cause the lead wire 126 to move backward. When the said lead wire is touching the pin of the second wheel, it goes backward immediately; in other words, the touching time is very short. By the same token, when the pin under the bottom side of the hour wheel and the minute wheel and the pin of the second wheel are superimposed on a straight line, the lead wires 123, 125 will first touch the pins, and the OR GATE 1PF will have a LOW output, which will, thru the differential circuit, cause the SCHMITT TRIGGER 1PI to have a pulse output so as to drive the lead-in wire 126 to move forward. When the three pins are superimposed on a straight line, the pin of second wheel touches the lead-in wire 126 and the time is 03:58 AM (it may be set at different time) Then, the NAND GATE 1PS will have a negative output pulse, which will go thru NOR GATE 1PH and the AND GATE 1PL to cause the "Q" terminal of NOR R/S LATCH 1PM to change to HIGH and be applied to the following stage thru lead wire 121. At the same time, the said negative pulse will go through the INVERTER 1PT to cause the lead wire 126 to go backwards. By the same token, when the upper two pins of the minute wheel and the second wheel are almost superimposed on a straight line, the lead wire 124 will first touch the pin, and the OR GATE 1PO will have a LOW output, which will, thru the differential circuit, cause the SCHMITT TRIGGER 1PZ to have a pulse output to move the lead wire 126 forwards. When the two pins are superimposed in a straight line, the pin of the second wheel will touch the lead wire 126; now, we use the said moment as the time of calibration, i.e., 04:00 AM (For the American type system, it is 04:01 and zero second). Then the NAND GATE 1PS will have an output of negative pulse, which will thru NOR GATE 1PP, cause the "Q" terminal of NOR R/S LATCH 1PQ to change to LOW which will become an output thru lead-in wire 84 (for the circuit to be continued, see the explanations in item 11). At the same time, the said negative pulse will, thru INVERTER 1PT, cause the lead wire 126 to go backwards.

Figure 5:
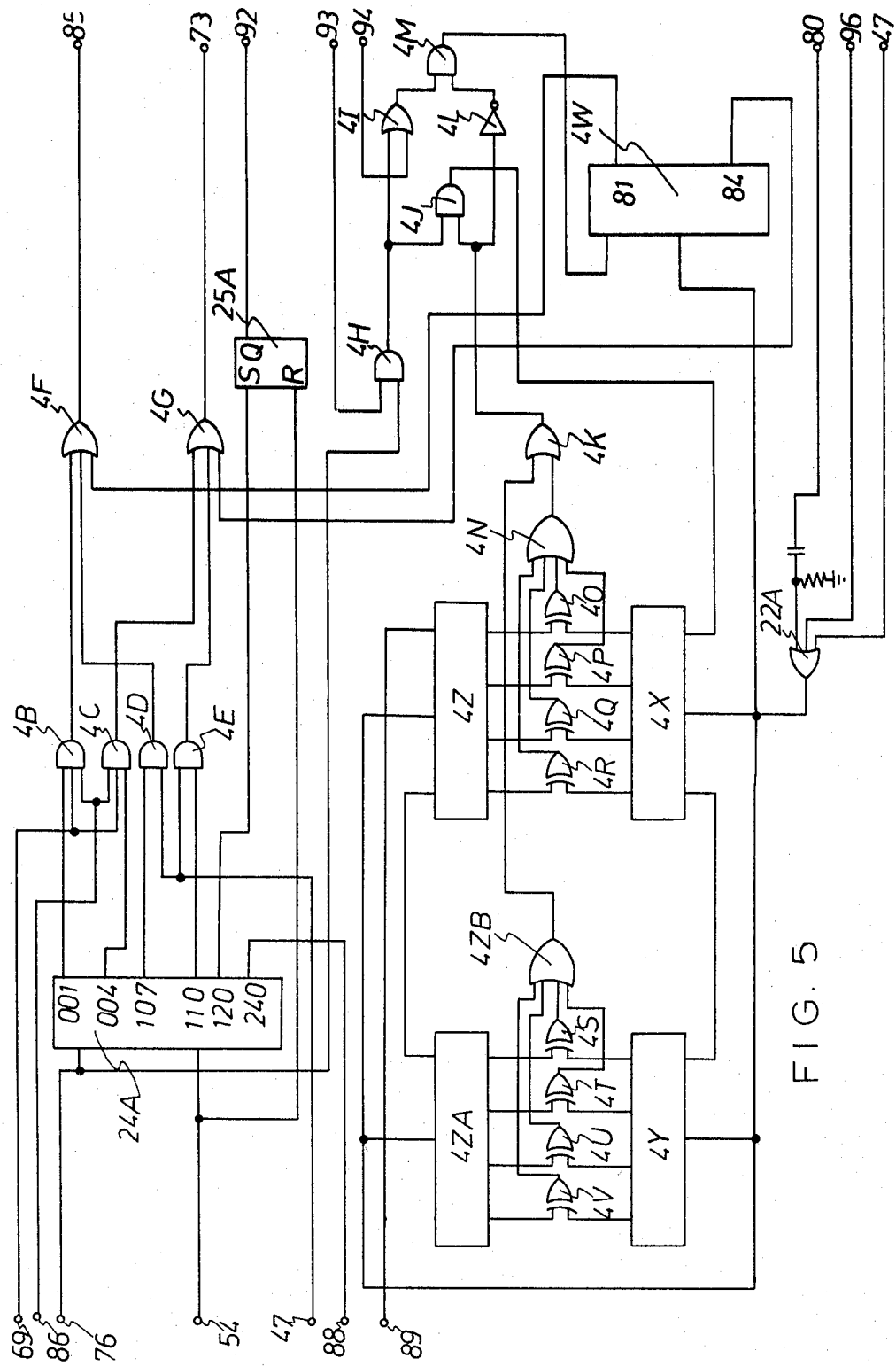

4. As shown in FIGS. 4 and 5, INVERTER 2F will transmit pulses at 10 HZ to DIVIDER 3A where the 10 HZ pulses are divided by 10; then, pulses at 1 HZ are, thru lead wire 76, delivered to COUNTER 24A so as to start counting the time together with the timepiece 41 on a synchronization basis. Simultaneously, the said 1 HZ pulse is delivered to the input terminal of AND GATE 4H.

Figure 10:
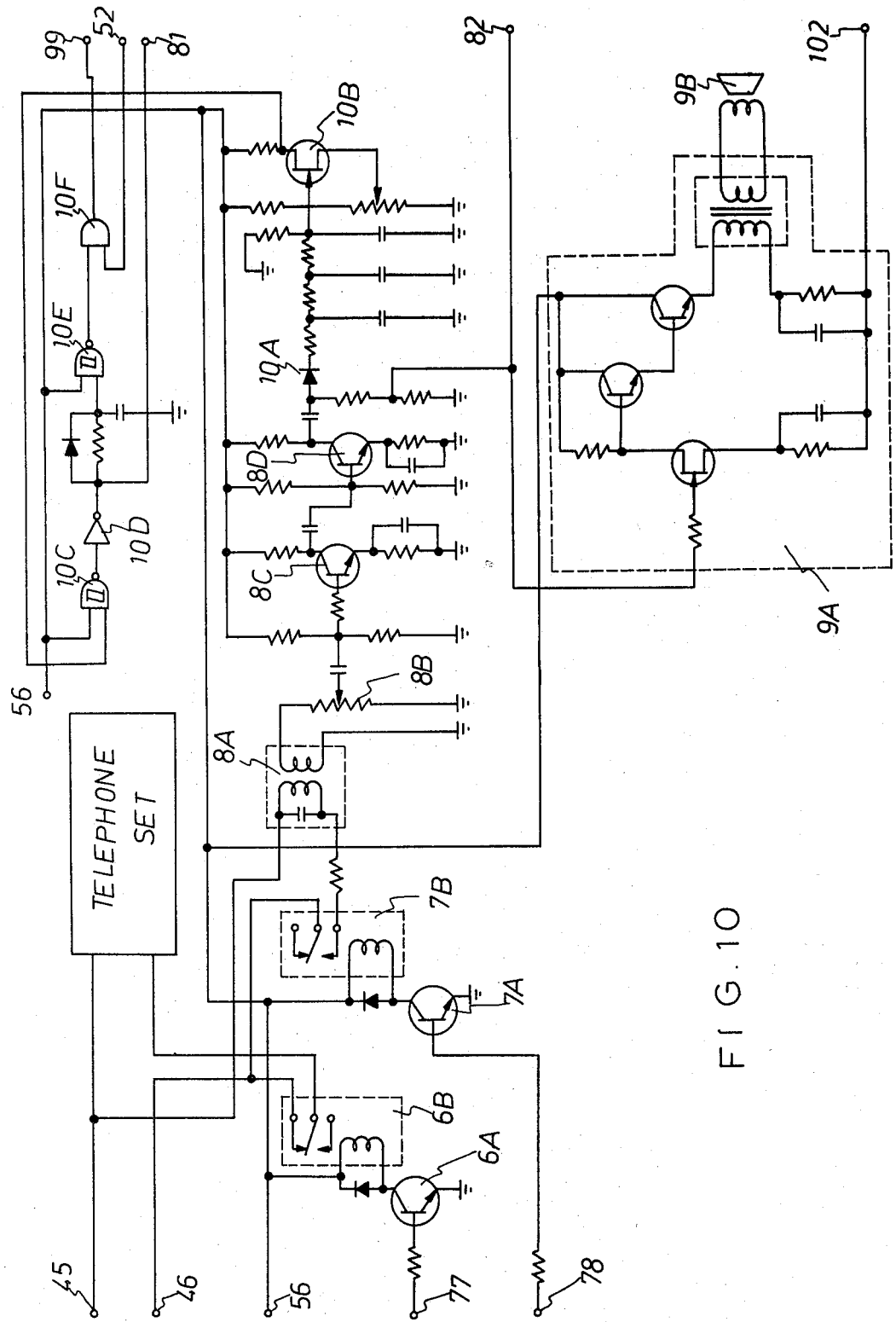
FIG. 10 shows the control and the monitor circuit of this invention being used with telephone line.

5. COUNTERS 4Z and 4ZA are the "ahead of time difference memory circuit of timepiece 41", and COUNTER 4W is the "behind time difference memory circuit of timepiece 41". If the timepiece 41 is faster than the standard time, the COUNTERS 4Z and 4ZA will record and store a time difference signal, comparing it with COUNTERS 4X & 4Y; then, a non-equlibrium state will exist. Consequently, OR GATE 4K will have a HIGH output, and the aforesaid 1 HZ pulses will, thru AND GATE 4H & 4J, go into COUNTERS 4X & 4& for count numbers. As soon as the counting is equal to the time difference stored in COUNTERS 4Z & 4ZA, the output of OR GATE 4K becomes LOW, and the output of INVERTER 4L becomes HIGH. Simultaneously the 1 HZ pulses will, thru OR GATE 4I and AND GATE 4M, be delivered to COUNTER 4W for continuously counting. If the timepiece 41 is behind the standard time, the aforesaid pulse of 1 HZ will, thru AND GATE 4H, OR GATE 4I, and AND GATE 4M, be delivered to COUNTER 4W for count accumulation. When the COUNTER 4W counter to number 81 which is approximately at 03:59 and 21 seconds of standard time (it may be set at a different moment), the said counter 4W will have a HIGH output, which will go thru OR GATE 4F and lead wire 85 to cause the "Q" terminal of NOR R/S LATCH 5D to generate a HIGH output. The said HIGH signal will go thru AND GATE 5B, lead wire 78, TRANSISTOR 7A, and RELAY 7B to cause the telephone line 46 to be connected with the COUPLING TRANSFORMER 8A as shown in FIG. 4, 5, and 10. At the same time, the HIGH OUTPUT pulse of COUNTER 4W will go thru INVERTER 5F to cause the "Q" terminal of NOR R/S LATCH 5G to go HIGH within one second. Two seconds after that moment, the voice signal, if the telephone set being used, will go thru lead wire 81, AND GATE 5C, and OR GATE 5E to cause the HIGH at "Q" terminal of NOR R/S LATCH 5D to change to LOW, and the said LOW causes the COUPLING TRANSFORMER 8A to decouple from telephone line 46. On the other hand, if the telephone set is not used and the COUPLING TRANSFORMER 8A is connected to the telephone line 46, and the telephone set has a continuous "hum" signal, the lead wire 81 will be in a LOW state, and the "Q" terminal of NOR R/S LATCH 5D will remain in a HIGH state, and the COUPLING TRANSFORMER 8A remains connected to the telephone line 46 as shown in FIGS. 4, 5, 10. When the COUNTER 4W continuously counts to 84, which is approximately equal at the standard time of 03:59 and 24 seconds (it may be set at a different moment), it will have a HIGH output pulse, which will go thru OR GATE 4G, lead-in wire 73, and OR GATE 5H to cause the "Q" terminal of NOR R/S LATCH 5G to change to LOW, and simultaneously to cause the "Q" terminal of NOR R/S LATCH 5I to go HIGH. The said HIGH will go thru AND GATE 5A, lead wire 77, TRANSISTOR 6A, and RELAY 6B to cause the telephone 46 to decouple from telephone set 40 as shown in FIGS. 4, 5, 10.

As shown in FIG. 10, the signal from the telephone lines 45, 46 goes thru the two stage amplifier comprising COUPLING TRANSFORMER 8A and TRANSISTORS 8C & 8D, the diode rectifier 10A, the RC filter, and the FET amplifier 10B, a nd finally is delivered to SCHMITT TRIGGER 10C & 10E to generate a syllable square wave, which goes thru AND GATE 10F and lead wire 99 to subsequent stages.

6. The pulse output of the aforesaid COUNTER 4W at count 84 will go thru lead wire 73 to NAND GATE 12A together with the non-equalibrium square wave of 10 HZ from INVERTER 2F. The output pulse from INVERTER 2F is passed through a differentiator circuit, lead wire 72 and OR GATE 12B to set the "Q" output terminal of NOR R/S LATCH 12D HIGH. At the same time, the non-equilibrium (i.e., non-fifty percent duty cycle) square wave of 10 HZ (HIGH 67 ms, LOW 33 ms) passes through AND GAATE 12E and the lead wire 87 to be counted on COUNTER 13A. When the first 10 HZ pulse enters COUNTER 13A, COUNTER 13A simultaneously delivers an output pulse to AND GATE 15A then generated dial pulse of 67 ms, and when the 8th pulse is applied to AND GATE 15B it also generates a dial pulse of 67 ms. When the 15th pulse enters the input, NOR R/S LATCH 15G will have a HIGH output level at its "Q" terminal so as to permit the 10 HZ pulse, via AND GATE 15H, to continuously pass as an output. This continues until the 21st pulse passes through NAND GATE 15E, the differentiator circuit, and OR GATE 15G to cause the "Q" output terminal of NOR R/S LATCH 15G to become LOW. During the period when the "Q" terminal of NOR R/S LATCH 15G is HIGH, there is a total of seven dial pulses delivered successively from AND GATE 15H; these aforesaid dial pulses correspond to the telephone number of the time repeat station 117, and all of these pulses, passes through OR GATE 15C, NAND GATE 15D, lead wire 90, AND GATE 5B, lead wire 78, and TRANSISTOR 7A to cause relay 7B to initiate a dialing action (more details, see FIGS. 4, 5, 6, 10.)

Figure 6:
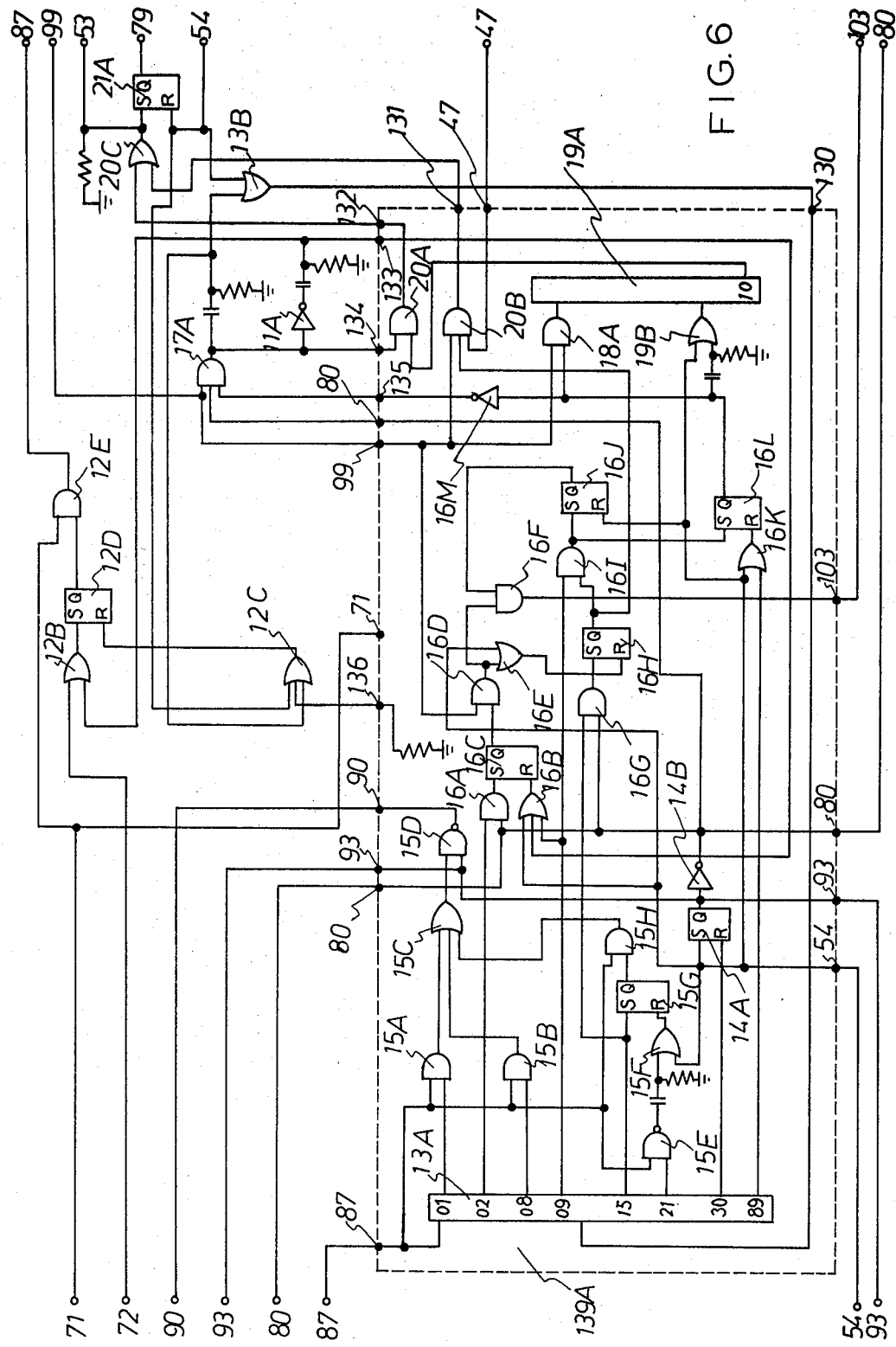
Figure 12:
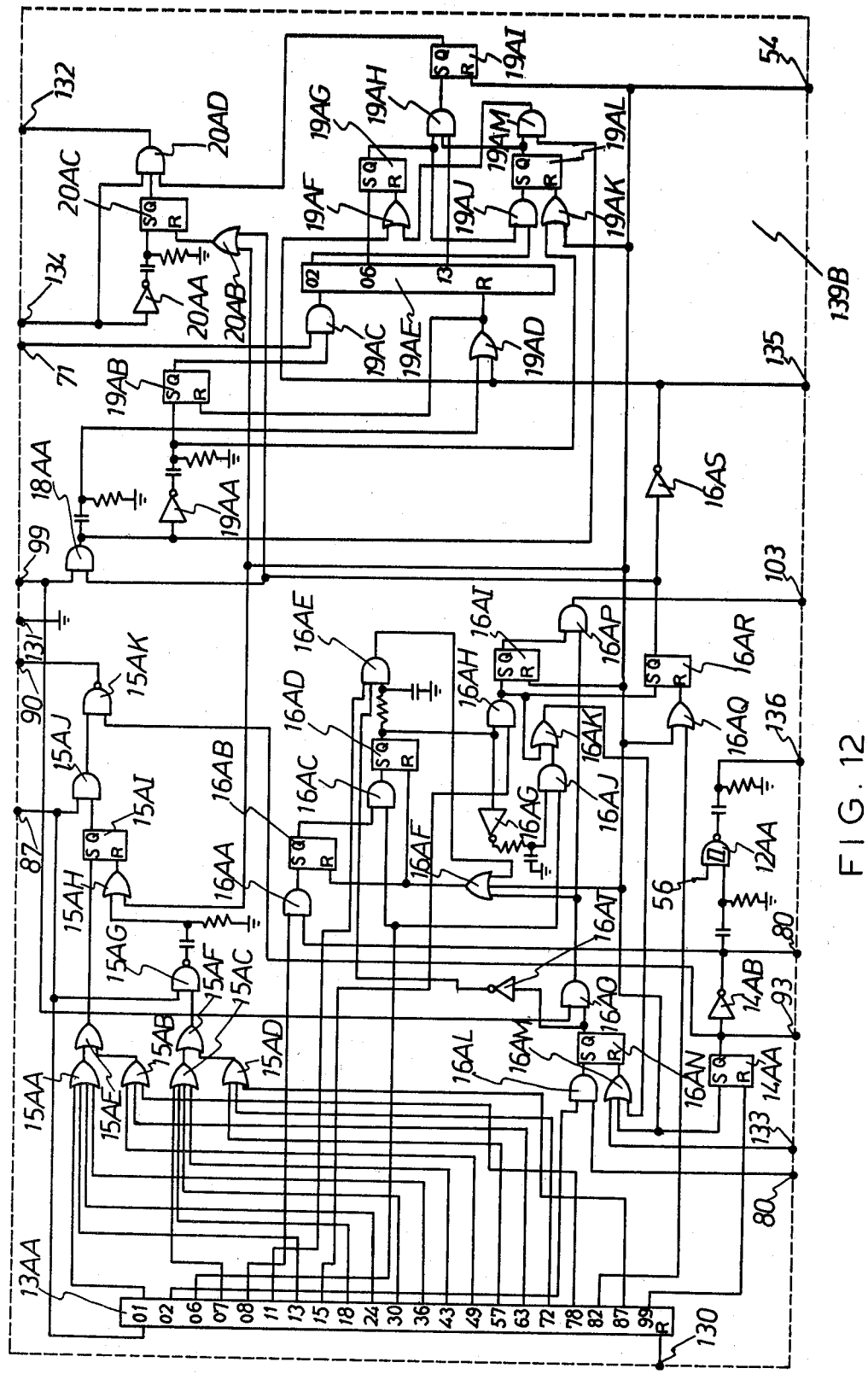
FIG. 12 shows the automatic dial and time signal separation control circuit being used with the American type of time repeat system.

When the 30th 10 HZ pulse enters COUNTER 13A, it generates a pulse to cause the "Q" terminal of NOR R/S LATCH 14A to become LOW, and to cause the output signal of OR GATE 15C to be inhibited at NAND GATE 15D. At the same time via lead wire 93, this pulse from counter 13A passes through AND GATE 4H to stop the 1 HZ signal from reaching COUNTER 4W and being counted. Instead the 1 HZ signal passes through INVERTER 14B, lead wire 80, the differentiator circuit and OR GATE 22A to reset the COUNTERS 4W, 4X, 4Y, 4Z & 4ZA; for more details, see FIGS. 5 & 6. When used in the American type of time repeat system, the dotted line portion 139A of FIG. 6 is changed to the dotted line portion 139B of FIG. 12, and the rest circuits remain unchanged.

The telephone number of time repeat stations in the United States is a 7-digit number; for instance, in California, the number is "7678900". As shown in FIGS. 4, 6, 10, 12, the non-equilibrium square wave of 10 HZ passes thru lead wire 87 to COUNTER 13AA to be cunted. When the first pulse is counted, COUNTER 13AA delivers a pulse thru OR GATES 15AA and 15AE to cause the "Q" output terminal of NOR R/S LATCH 15AI to go HIGH and to cause the 10 HZ pulse at lead wire 87, to pass through AND GATE 15AJ, NAND GATE 15AK, lead wire 90, AND GATE 5B, lead wire 78, and TRANSISTOR 7A successively so as to cause the relay 7B to initiate a dialing action until the 7th pulse is received at COUNTER 13AA. COUNTER 13AA delivers a pulse thru OR GATES 15AC and 15AF and with the 10 HZ pulse at lead 87 causes NAND GATE 15AG to provide a pulse through the differentiator circuit, and OR GATE 15AH to cause the "Q" terminal of NOR R/S LATCH 15AI to LOW. During the period when the "Q" terminal of NOR R/S LATCH 15AI is HIGH, AND GATE 15AJ generates 7 successive dialing pulses correspond to "7" digits; by the same token, the 13th thru 18th pulses correspond to "6"; the 24th thru 30th pulses stand for "7"; the 36th thru 43rd pulse represent "8"; the 49th thru 57th pulses correspond to "9"; the 63rd thru 72nd pulses correspond to "0"; the 78th thru 87th pulse stand for "0"; the pulses generated by AND GATE 15AJ are the dialing pulses corresponding to the number of the time repeat station. When the 99th pulse of 10 HZ is applied to COUNTER 13AA, it generates a pulse to cause the "Q" terminal of NOR R/S LATCH 14AA to go LOW, and to inhibit passage of 10 HZ pulses thru NAND GATE 15AK. Simultaneously, the pulse from counter 13AA passes thru the delay circuit comprising the INVERTER 14AB, SCHMITT TRIGGER 12AA, lead wire 136 and OR GATE 12C to cause the "Q" terminal of NOR R/S LATCH 12D to go LOW, and to stop the count at the COUNTER 13AA. The functions of NOR R/S LATCH 14AA and INVERTER 14AB are the same as that of NOR R/S LATCH 14A and INVERTER 14B.

7. When connected to the time repeat station by dialing as shown in FIG. 6, a series of time repeat signals, thru lead wire 99, are applied to AND GATE 17A. The positive edge of each syllable square wave passes thru the differentiator circuit and OR GATE 12C to cause the "Q" terminal of NOR R/S LATCH 12D to go LOW. The 10 HZ pulse is prevented from passing through AND GATE 12E and COUNTER 13A stop counting. The differentiated signal simultaneously passes thru OR GATE 13B to cause the COUNTER 13A to reset.

The negative edge of each syllable square wave passes through INVERTER 11A, the differentiator circuit and OR GATE 12B to cause the "Q" terminal of NOR R/S LATCH 12D to go HIGH. The 10 HZ again passes through AND GATE 12E to COUNTER 13A to start counting again, with the same procedures repeating. As explained in (A) or (1) mentioned above for the Chinese type time repeat signal, "Du . . . ", has a rather long silent interval from its start and end syllables. It separates its start syllable with about 1.4 seconds of silent interval, and its end syllable with about 0.8 seconds of silent interval, and there are no other voice syllables having longer silent interval from the start or the end syllables. Consequently, if any syllable having a silent interval with its start syllable over 1.4 seconds and with its end syllable over 0.8 seconds, it must be the syllable of the time repeat signal (Du . . . ). In a series of syllable square waves A,B,C, if the silent interval between A and B is longer than 1.4 seconds, and the silent interval between B and C is shorter than 0.8 seconds, it indicates B is not a "Du . . . " signal.

When the negative edge of an A syllable square wave causes the "Q" terminal of NOR R/S LATCH 12D to go HIGH, and when a 10 HZ pulse passes thru AND GATE 12E to COUNTER 13A to count to 1.4 seconds, it generates a pulse which passes thru AND GATE 16G to cause the "Q" terminal of NOR R/S LATCH 16H to go HIGH. The positive edge of a B syllable square wave causes the counter 13A to reset, and its negative edge causes the COUNTER 13A to re-count to 0.1 seconds; COUNTER 13A generates a pulse which passes thru AND GATE 16A to cause the "Qa" terminal of NOR R/S LATCH 16C to go HIGH. Before the "Q" terminal of 16C goes LOW, the C syllable square wave is generated and will passes thru AND GATE 16D and OR GATE 16E to cause the "Q" terminal of 16H to go LOW, and to cause COUNTER 13A to recount. In a series of syllable square waves D, E, F, if the silent interval between D and E is longer than 1.4 seconds, and the silent interval between E and F is longer than 0.8 seconds, it indicates that E is the time repeat signal "Du . . . ", and the circuit operates as follows.

When the negative edge of syllable square wave D causing the "Q" terminal of NOR R/S LATCH 12D to go HIGH, the 10 HZ pulse passes thru AND GATE 12E to cause COUNTER 13A to start counting. When the second 10 HZ pulse is received at COUNTER 13A (0.1 seconds), it generates a pulse which passes thru AND GATE 16A to cause the "Q" terminal of NOR R/S LATCH 16C to go HIGH. When the 9th pulse is applied to COUNTER 13, that COUNTER generates a pulse which passes thru OR GATE 16B to cause the "Q" terminal of NOR R/S LATCH 16C to go LOW. When the 15th pulse is received (1.4 seconds), COUNTER 13A generates a pulse which passes thru AND GATE 16G to cause the "Q" terminal of NOR R/S LATCH 16H to go HIGH. When next syllable square wave E appears, its positive edge causes the COUNTER 13A to reset, and its negative edge causes COUNTER 13A to start re-counting. By the same token, when the second 10 HZ pulse is received (0.1 seconds), the "Q" terminal of NOR R/S LATCH 16C goes HIGH. When the 9th pulse is received (0.8 seconds), COUNTER 13A generate a pulse going thru OR GATE 16B and AND GATE 16I to cause the "Q" terminal of NOR R/S LATCH 16C to go LOW and the "Q" terminals of 16J and 16L to go HIGH. At this time, the voice signal and time repeat signal are separated by the HIGH and LOW voltages of the "Q" terminal of 16L. When the 89th pulse is received (8.8 seconds), i.e., between the last syllable of the voice signal and the "Du . . . " syllable of next time repeat signal, the COUNTER 13A generates a pulse going thru OR GATE 16K to cause the "Q" terminal of NOR R/S LATCH 16L to go LOW. When the "Q" terminal of 16L is HIGH, all receives signals are voice signals, and thru AND GATE 18A, cause COUNTER 19A to count the number of syllables. When the "Q" terminal of 16L is LOW, the output of inverter 16M is HIGH; during this time, all the received signals are the time repeat sigal, "Du . . . ", which passes thru AND GATE 17A as an output; the positive edge of said signal causes COUNTER 13A to reset, and its negative edge causes COUNTER 13A to re-count; the aforesaid procedures are repeated every 10 seconds.

The first calibration time of the embodiment of this invention 04:00, or other suitable time; its voice signal comprises 10 syllables, i.e., "hsia mien yin hasiang szu dien ling fed ling miao". When the "Q" terminal of NOR R/S LATCH 16L is HIGH, the syllable counted by COUNTER 16A is ten, and time repeat signal to be announced is that of 04:00, which will go thru AND GATE 20A and OR GATE 20C to cause the "Q" terminal of NOR R/S LATCH 21A to go HIGH. At the same time, the said HIGH, thru lead wire 53, is applied to the "secondary timepiece". For the American type of time repeat system, the dotted portion 139A of FIG. 6 is replaced with the dotted line portion 139B of FIG. 12 without changing other circuits. According to the explanation in (A), (2) of "1" above, the preparatory signal (Du) and time repeat signal (Lin) of the American type of time repeat system have longer silent invervals from their adjacent syllables respectively; "Du . . . " has about 0.7 seconds silent interval from its start syllable, and has about 0.5 seconds silent interval from its end "Lin . . . " syllable; the said "Lin . . . " syllable has about 1.4 seconds silent interval from its end syllable, and there are no such conditions with other voice signal.

In a series of syllable square wave of G, H, I, J, if the silent interval between G and H is longer than 0.7 seconds, and the silent interval between H and I is shorter than 0.5 seconds then, the negative edge of G enables a pulse of 10 HZ to pass thru lead wire 87 to cause COUNTER 13AA to count. When the 8th pulse of 10 HZ is received (0.7 seconds), COUNTER 13AA generates a pulse which passes thru AND GATE 16AA to cause the "Q" terminal of NOR R/S LATCH 16AB to go HIGH. When the syllable square wave is received, its positive edge resets COUNTER 13AA, and its negative edge causes COUNTER 13AA to re-count. After 0.1 seconds, COUNTER 13AA generates a pulse which passes thru AND GATE 16AL to cause the "Q" terminal of NOR R/S LATCH 16AN to go HIGH, and before the "Q" terminal of 16AN goes LOW, the I syllable square is generated. The said I syllable passes through lead wire 99, AND GATE 16AO and OR GATE 16AF to cause the "Q" terminal of 16AB to go LOW, and to cause COUNTER 13AA to re-count. By the same token, if the silent interval between G and H is longer than 0.7 seconds, and the silent interval between H and I is longer than 0.5 seconds, and the silent interval between I and J is shorter than 1.4 seconds, and when the negative edge of the G square wave makes COUNTER 13AA re-count for 0.7 seconds, the "Q" terminal of NOR R/S LATCH 16AB changes to HIGH. When the negative edge of the H square wave causes the COUNTER 13AA to count for 0.5 seconds, the "Q" terminal of 16AD changes to HIGH as well. When the negative edge of the I square wave causes COUNTER 13AA to count for 0.1 seconds, the "Q" terminal of 16AN goes HIGH. Before the "Q" terminal of 16AN goes LOW, the J syllable square wave is generated and causes the "Q" terminals of 16AB and 16AD to go LOW and causes the COUNTER 13AA to re-count.

If the silent interval between H and I is longer than one second, COUNTER 13AA, upon counting to one second, generates a pulse which is transmitted thru AND GATE 16AE; then, the output of inverter 16AT is HIGH. Consequently, the said pulse passes thru AND GATE 16AE and OR GATE 16AF to cause the "Q" terminals of 16AB and 16AD to go LOW so as to prevent the NOR R/S LATCH 16AI and 16AR from generating an abnormal effect; for more details, see FIG. 12. In a series of syllable square waves of K, L, M, N, if the silent interval between K and L is longer than 0.7 seconds, and the silent interval between L and M is longer than 0.5 seconds, and between M and N is longer than 1.4 seconds; it indicates that L is the preparatory signal "Du . . . ", and M is the time repeat signal "lin . . . ", and the circuit will operate as follows: The negative edge of syllable square wave K has a 10 HZ pulse of applied to COUNTER 13AA thru lead wire 87 and causes the COUNTER 13AA to count. When the 8th pulse of 10 HZ is applied (0.7 seconds), COUNTER 13AA generates a pulse which passes thru AND GATE 16AA to cause the "Q" terminal of NOR R/S LATCH 16AB to go HIGH. When the syllable square wave L is applied, its positive edge causes the COUNTER 13AA to reset, and its negative edge again causes the COUNTER 13AA to re-count. When the 6th pulse of 10 HZ is received (0.5 seconds), COUNTER 13AA again generates a pulse which passes thru AND GATE 16AC to cause the "Q" terminal of NOR R/S LATCH 16AD to go HIGH. By the same token, the syllable square wave M again causes the COUNTER 13AA to recount. When the 15th pulse of 10 HZ is received (1.4 seconds), COUNTER 13AA again generates a pulse which is passed thru AND GATE 16AH to cause the "Q" terminals of NOR R/S LATCH 16AE and 16AR to go HIGH. Beginning at this time, the voice and time repeat (including preparatory) signals are separated by the HIGH and LOW voltages of "Q" terminal of 16AR. When the 82nd pulse is received (8.1 seconds), which is approximately between the last syllable of voice signal and the next preparatory signal, "Du . . . ", the COUNTER 13AA again generates a pulse which passes thru OR GATE 16AQ to cause the "Q" terminal of 16AR to go LOW. During the HIGH state of the "Q" terminal of 16AR, all the signals appeared received are voice signal and pass thru lead wire 99 and AND GATE 18AA. During the LOW state of "Q" terminal of 16AR, inverter 16AS generates a HIGH output, and during that time, the received signal is preparatory signal "Du . . . " and the time repeat signal "Lin . . . ", which will go thru AND GATE 17A to provide output. The positive edge of this signal causes COUNTER 13AA reset, and its negative edge causes COUNTER 13AA to re-count. The said procedures repeat once again every 10 seconds; for more details, see FIGS. 6 and 12.

The first embodiment of this invention is suitable for the American type of time repeat system, and it is set at 04:01 AM, or other suitable time. According to the explanations in (B), (2) of "1" mentioned above, the voice signal comprises three syllable groups a, b, c, and the syllable groups a and b each have more than two syllables, while the syllable group b has two or more than two syllables before 04:00 and 50 seconds. At 04:01, the said b syllable group reduces to only one syllable with longer silent intervals from its start and end syllables; the said one syllable has a silent interval from its start syllable longer than 0.5 seconds, and has a silent interval from its end syllable longer than 1.2 seconds. There is no other voice syllable having such a long silent interval from its adjacent syllables; therefore, in a series of voice signal syllables, if there is any syllable having a silent interval from its start and end syllables longer than 0.5 seconds and 1.2 seconds respectively, it must be the voice signal of 04:01, i.e., the only syllable group with one syllable.

In a series of voice syllable square waves of R, S, T which are passed thru lead wire 99 and AND GATE 18AA as output, if the silent interval between R and S is longer than 0.5 seconds, and between S and T is shorter than 1.2 seconds, the S is not a one syllable signal. The negative edge of the R square wave passes thru inverter 19AA and differentiator circuit to cause the "Q" terminal of NOR R/S LATCH 19AB to go HIGH. The 10 HZ pulse passes thru lead wire 71 and AND GATE 19AC to cause counter 19AE to start to count. When the 6th pulse of 10 HZ is received (0.5 seconds), counter 19AE generates a pulse to cause the "Q" terminal of NOR R/S LATCH 19AG to go HIGH. If the silent interval between the R and S syllables is over 1.2 seconds, the "Q" terminal of NOR R/S LATCH 19AL is LOW, and the output pulse of counter 19AE does not pass thru AND GATE 19AH, and the "Q" terminal of NOR R/S LATCH 19AI does not change its state. When syllable square wave S is received, its positive edge passes thru the differentiator circuit and OR GATE 19AD to cause counter 19AE to reset, and to cause the "Q" terminal of NOR R/S LATCH 19AB to go LOW. The pulse of 10 HZ cannot pass thru AND GATE 19AC and the negative edge of said pulse causes counter 19AE to re-count. Upon counting for 0.1 seconds, the said counter generates a pulse which passes thru AND GATE 19AJ to cause the "Q" terminal of NOR R/S LATCH 19AL to go HIGH. Before the "Q" terminal of 19AL becomes LOW, the syllable square wave T is generated and passes thru AND GATE 19AM and OR GATE 19AF to cause the "Q" terminal of 19AG to go LOW, and to cause the counter 19AE to re-count; for more details, see FIG. 12.

In a series of voice syllable square waves of U, V, W, if the silent interval between U and V is longer than 0.5 seconds, and between V and W is longer than 1.2 seconds; in that case, the V is the only syllable "one" of syllable group "b" of voice signal at 04:01; then, the circuit will have the following operation: The negative edge of syllable square wave U causes the counter 19AE to count, and upon counting for 0.5 seconds, the said counter generates a pulse to cause the "Q" terminal of 19AG to go HIGH. Upon reception of syllable square wave V, its positive edge causes counter 19AE reset, and its negative edge causes 19AE to re-count for 0.1 seconds. Then, it will generate a pulse which passes thru AND GATE 19AJ to cause the "Q" terminal of 19AL to go HIGH, which will be reflected at AND GATE 19AH. Upon counting for 1.2 seconds, 19AE again generates a pulse which is passed thru AND GATE 19AH to cause the "Q" terminal of 19AI to go HIGH, which is further reflected at AND GATE 20AD. When inverter 16AS provides a HIGH output and and transmits it thru lead wire 135 and to AND GATE 17A, the syllable square wave of preparatory signal "DU . . . " and the time repeat signal "Lin . . . " pass thru lead wire 99, AND GATE 17A and lead wire 134 to inverter 20AA and AND GATE 20AD. The negative edge of the square wave of the preparatory signal "DU . . . " passes thru inverter 20AA and the differentiator circuit to cause the "Q" terminal of NOR R/S LATCH 20AC to go HIGH. Therefore, only the square wave of the time repeat signal "Lin . . . " received afterwards can pass thru AND GATE 20AD. The said square wave of "Lin . . . " is the time repeat signal right at 04:01, which is passed thru lead wire 132 and OR GATE 20C to cause the "Q" terminal of NOR R/S LATCH 21A to go HIGH. At the same time, it passes thru lead wire 53 to enter into the secondary timepiece; see FIGS. 6 and 12 for further details.

8. As explained in "4" mentioned above, a pulse of 1 HZ in applied thru lead wire 76 to cause counter 24A to count at constant speed and in synchronization with timepiece 41; when counting to the designed calibration time (04:00 of Chinese type, or 04:01 of American type), it generates a pulse to cause the "Q" terminal of NOR R/S LATCH 25A to go HIGH; for further details, see FIG. 5.

9. As shown in FIGS. 5, 6 and 7, if the "Q" terminal of NOR R/S LATCH 21A goes HIGH first, and as soon as the "Q" terminal of the NOR R/S LATCH 25A changes to HIGH, the output of "Q" terminal of 21A passes thru lead wire 79 to cause inverter 27A to transmit a LOW to AND GATE 27B. When the HIGH pulse of "Q" terminal of 25A is applied to 27B thru lead wire 92, the "Q" terminal of NOR R/S LATCH 27C is still LOW; on the contrary, when the "Q" terminal of 25A goes HIGH, it causes the "Q" terminal of 27C to go HIGH simultaneously.

10. As shown in FIGS. 5, 6 and 7, when the "Q" terminal of NOR R/S LATCH 21A or 25A goes HIGH, and this is reflected thru OR GATE 28D to AND GATE 28E, a pulse of 10 HZ passes thru lead wire 71, AND GATE 23B and 28E to counters 28I, 28J, and 28K for counting the time difference, and the OR GATE 28O output goes HIGH. When the "Q" terminal of 21A and 25A goes HIGH, the output of AND GATE 28A is HIGH and is reflected thru inverter 28B to become a LOW applied to AND GATE 28E. At this time, the counter 28I, 28J, 28K stops counting and the 10 HZ pulse passes thru AND GATE 28C to counters 28F, 28G, 28H for counting. When their count is equal to the time difference counted by counter 28I, 28J, 28K, the output of OR GATE 28O changes to LOW, and the counters 28F, 28G, 28H stop counting.

11. If the "Q" terminal of NOR R/S LATCH 21A goes HIGH before the "Q" terminal of 25A goes HIGH, the "Q" terminal of NOR R/S LATCH 27C is LOW in accordance with the explanation in "9" above. Then, the inverter 27D provides a HIGH output which is passed through OR GATE 30A to AND GATE 30B. Consequently, when the telephone time repeat signal causes the "Q" terminal of 21A to go HIGH, the HIGH pulse passes thru lead wire 79, AND GATE 30B, and the differentiator circuit, from which a differentiator signal is generated and passes thru lead wire 65 to the timepiece 41 for resetting the seconds to zero. At the same time, the HIGH of the "Q" terminal of 21A passes thru AND GATE 31A and lead wire 66 to the timepiece 41 to operate the "fast set control" until the timepiece 41 reaches the calibration time, i.e., 04:00 (In American type, it is 04:01). An excitation signal is then generated and passed thru lead wire 120 and AND GATE 1M to cause the "Q" terminal of NOR R/S LATCH 1J to go LOW. That LOW is transmitted thru lead wire 84 and AND GATE 31A to stop the "fast set control" and to continue the counting. The time indicated by timepiece 41 is now at the standard time, i.e., 04:00 (In American type, it will be 04:01). Up to this moment, calibration of the timepiece lagging the standard time is automatic. On the contrary, if the "Q" terminal of 25A goes HIGH earlier than the "Q" terminal of 21A, the "Q" terminal of 27C goes HIGH in accordance with the explanations in "9" above. According to the explanations in "10" above, when the timepiece 41 reaches 04:00, the predetermined calibration time (In American type, it is 04:01), it generates a pulse to cause the "Q" terminal of 25A to go HIGH, to cause the counter 28I, 28J, to count the time difference, and also to cause OR GATE 28O to generate a HIGH at AND GATE 29A. Consequently, when the "Q" terminal of 21A goes HIGH, the said HIGH passes thru lead wire 79, AND GATE 29A, and lead wire 64 to timepiece 41 to stop the timepiece for an interval which is equal to the time difference. In other words, the timepiece resumes running upon the output of OR GATE 28O changing to LOW; then, the time indicated by the timepiece 41 is the standard time. Calibration of the timepiece ahead of standard time is automatically done; for further details, see FIGS. 2, 4, 5, 6 and 7. If the conventional timepiece is a hand type timepiece, the dotted line portion 138A of FIG. 7 should be replaced with the dotted line portion 138B of FIG. 9. If the "Q" terminal of NOR R/S LATCH 21A goes HIGH earlier than the "Q" terminal of 25A, the pulse of 240 HZ enters divider 37B thru lead wire 74 and is divided by 10. The pulse of 24 HZ then passes thru AND GATE 37A and lead wire 66 to timepiece 41 to causes the second hand of timepiece to rotate fast. When the second hand reaches the predetermined calibration time, 04:00 (In American type, it is 04:01), the "Q" terminal of NOR R/S LATCH 10Q goes LOW as explained in "3" above. Then this LOW level is reflected thru lead wire 84 to AND GATE 37A to stop the fast rotation of the second hand and to continue counting time. Now, the time indicated by the timepiece 41 is the standard time of 04:00 (In American type, it is 04:01), calibration of the timepiece lagging the standard time is done automatically. On the contrary, if the "Q" terminal of 25A HIGH earlier than the "Q" terminal of 21A, the output of AND GATE 36A passes thru lead wire 64 to timepiece 41 to stop the timepiece for an interval which is equal to the time difference. Then, the time indicated by the timepiece is the standard time, and the calibration of timepiece ahead of standard time is done automatically. The theory of generating stopping signal with AND GATE 36A is the same as that of AND GATE 29A; for further details, see FIGS. 5, 6, 7, 8 and 9.

12. If the timepiece 41 is lagging the standard time, the Q terminal of NOR R/S LATCH 27C will, in accordance with the explanation in "9" mentioned above, remain LOW. The pulse of 10 HZ passes from AND GATE 28C, and thru AND GATE 32A and lead wire 67 for further output; on the contrary, if the timepiece 41 is ahead of the standard time, the time difference pulse of 10 HZ passes thru AND GATE 33A and lead wire 68 for further output. According to the explanation in "10" mentioned above, the number of output pulses is just equal to the time difference number counters by counter 28I, 28J, 28K, and each pulse is equal to 1/10 seconds of time difference as shown in FIGS. 2 and 7.

If timepiece 41 has no calibration device, there is a switch 44 connected to "+V". If the said timepiece is lagging the standard time, the time difference pulse passes thru AND GATE 32A, OR GATE 34A to divider 34B to be divided by 10. Then, the time difference pulse of 1 HZ will go thru AND GATE 34D, lead wire 94, OR GATE 4I and AND GATE 4M to counter 4W for memory. By the same token, if the timepiece 41 is ahead of standard time, the time difference pulse passes thru AND GATE 33A and OR GATE 34A to divider 34B to be divided by 10. Then, the time difference pulse of 1 HZ passes thru AND GATE 34C and lead wire 89 to counter 4Z and 4ZA for remembering the time difference of timepiece 41 so as to use the memory for resetting the time of dialing the telephone of time repeat station. The theory of circuit function is the same as that explained in "5" mentioned above as shown in FIGS. 2, 5, 7. If the timepiece 41 has a calibration device, the switch 44 is connected to ground. If the timepiece 41 is lagging the standard time, the time difference pulse of 10 HZ is generated from AND GATE 32A, going thru lead 67 to the fast setting device of timepiece 41 so as to automatically calibrate the timepiece lagging the standard time. By the same token, if the timepiece 41 is ahead of the standard time, the time difference pulse of 10 HZ is generated by AND GATE 33A, and passes thru lead wire 68 to the backward setting device of timepiece 41 so as to automatically calibrate the timepiece ahead of the standard time as shown in FIGS. 2 and 7.

13. If the telephone time repeat signal has set the "Q" terminal of NOR R/S LATCH 21A HIGH, the said HIGH is transmitted thru lead wire 79, the retarding circuit, and OR GATE 5E to cause the "Q" terminal of NOR R/S LATCH 5D to go LOW; then, the telephone line 46 is separated from the coupling transformer 8A and connected with telephone set 40 as shown in FIGS. 4, 6 and 10.

14. As explained in "10" mentioned above, when counters 28F, 28G, 28H count to a number which is equivalent to the time difference recorded by counters 28I, 28J, 28K, the output of OR GATE 28O is LOW, and the output of inverter 28P is HIGH, which is reflected thru the retarding circuit comprising AND GATE 28Q, OR GATE 35B, and SCHMITT TRIGGER 35A, and the differentiator circuit, the lead wire 75, and OR GATE 1K, OR GATES 1C and 1H to cause the "Q" terminals of NOR R/S LATCH 1B and 1I to go LOW. Then, all circuits will be placed to the state as explained in "2" mentioned above as shown in FIGS. 4 and 7.

15. For the timepiece using A.C. power, in the case of the power being off and turning on again, the SCHMITT TRIGGER 26D generates an excitation signal to cause the "Q" terminal of NOR R/S LATCH 26E to go HIGH, and the circuit has the following operation:

(A). The said HIGH is transmitted thru OR GATES 26F and 26I to cause the "Q" terminal of NOR R/S LATCH 26H to LOW, and the "Q" terminal of 26K to go HIGH. The rest circuits are restored to the state as explained in "2" mentioned above as shown in FIG. 7.

(B). The said HIGH is reflected thru lead wire 70 and OR GATE 2D to cause the OSC., composed with SCHMITT TRIGGER 2E to generating a pulse of 10 HZ. This pulse passes thru inverter 2F, lead wire 71 and AND GATE 26A to cause the LED 26B to glow to show that the power is off, as shown in FIGS. 4 and 7.

(C). The "Q" terminal of NOR R/S LATCH 26K goes HIGH, which is reflected thru lead wire 86 to AND GATES 4B and 4C. Then, the starting time of next dialing the time repeat station will be advanced to 03:58 and one second (It may be set at other time), and the counter 24A generates a pulse which is transmitted thru AND GATE 4B and 4C for exciting the following circuits as shown in FIGS. 5 and 7.

(D). The time difference counted by counter 28I, 28J, 28K at the first time calibration after the power is turned on should not be considered as the time difference of a whole day; now, the "Q" terminal of NOR R/S LATCH 26H changes to LOW, and the time difference pulse at this time does not pass thru AND GATE 32A or 33A for output as shown in FIG. 7.

(E). Upon the completion of the first time calibration after the power is turned on, the "Q" terminal of NOR R/S LATCH 26H is restored to HIGH, and the "Q" terminal of 26K is again restored to LOW upon the completion of the second time calibration as shown in FIG. 7.

16. In case of the telephone service being interrupted during circuit functioning, AND GATE 16F generates a pulse, which passes thru lead wire 103 to OR GATE 26F to enable counter 24A to generate, at 04:02 (it may be set at other time), a pulse which is passed thru lead wire 88 to OR GATE 26F, thereby generating the circuit function as explained in (A), (C), (D), (E) of "15" above; for fruther details, see FIGS. 5, 6, 7.

17. Under normal conditions, the switch 43 is connected to "+V" 56. In case of power being off for over 25 minutes, or the timepiece having a time difference for over 25 minutes, the switch 43 may be connected to ground; then, the circuit automatically dials the telephone time repeat station, and the time repeat voice and signal are announced by speaker 9B for time calibration. When the switch 43 is connected to ground, the output of SCHMITT TRIGGER 38A is HIGH, which passes thru lead wire 51 to cause the "Q" terminal of NOR R/S LATCH 26E to go LOW. The LED 26B is turned off as shown in FIGS. 4, 7, 10.

18. In the case of calibrating the time and re-setting the speed once a day, switch 42 should be connected to ground. In the case of the said switch 42 being connected to "+V" 56, the time calibration and the speed resetting will be once every hour. Under such condition, the counter 24A generates a pulse, at about 10 seconds, (In American type, it would be about 30 seconds) before zero second of each hour (In American type, it is at the first minute and zero second of each hour). That pulse is passed through go thru AND GATE 4D and 4E to excite the automatic dialing circuit as shown in FIGS. 4 and 5.

Figure 11:
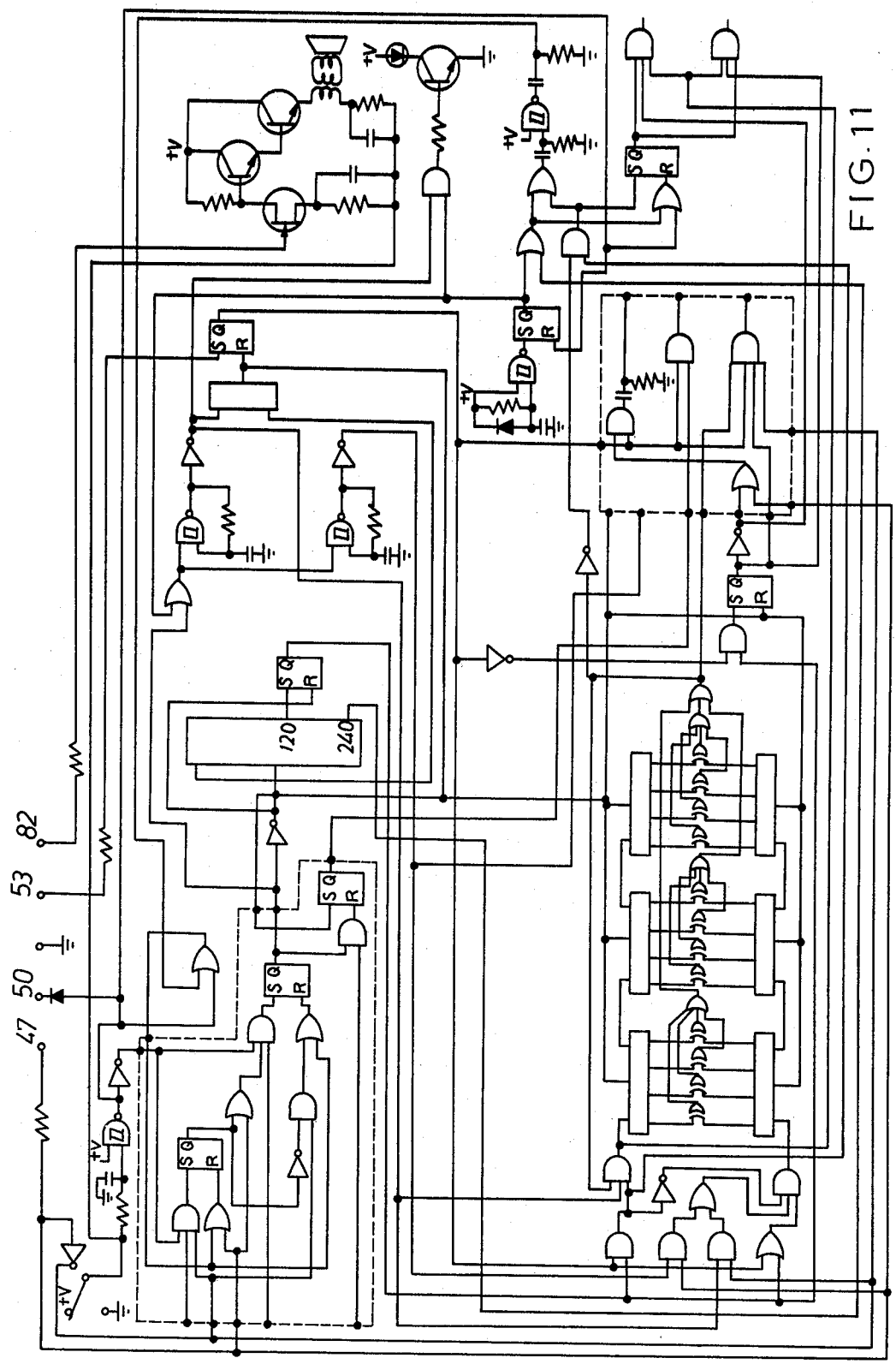
FIG. 11 shows the circuit diagram of the secondary timepiece of this invention.

For time difference counting, the OSC. circuit composed with SCHMITT TRIGGER 2H generates a pulse of 240 HZ which is passed thru inverter 2G, lead wire 74, AND GATE 23A, OR GATE 23C, and AND GATE 28E to counters 28I, 28J, 28K for fulfilling the function as shown in FIG. 7. In this embodiment of this invention, the secondary timepiece system comprises only 1–3, 9, 21, 23–33, 35–39, 43, 55 and the conventional timepiece 114 as shown in FIGS. 2 and 11, and the theory of circuit functions is the same as that the primary timepiece mentioned above.

I claim:

1. An automatic time-setting and adjusting system for a timepiece to be used in conjunction with a telephone standard time annunciation station which, when dialed, provides a voice signal announcing a approaching time and audible tone designating that time at the proper instant, said system comprising:
   first means for dialing said standard time annunciation system at a prescribed time;
   second means connected to said telephone line for separating voice signals from said audible tone;
   third means for analyzing the received voice signal from the standard time annunciation station to determine the announced time;
   fourth means for counting time synchronously with said timepiece and providing a time signal representing the time registered at said timepiece;
   fifth means for determining the time difference between the determined announced time and the time represented by said time signal and providing a time differential signal corresponding to the determined time difference;
   sixth means for adjusting the time and operating speed of said timepiece in accordance with said time differential signal; and
   seventh means responsive to said time differential signal for determining said prescribed time.

2. The system according to claim 7 further comprising:
   a secondary timepiece;
   eighth means for counting time synchronously with said secondary timepiece and providing a further time signal representing the time registered at said secondary timepiece;
   ninth means for determining the time difference between the determined announced time and the time represented by said further time signal and providing a further time differential signal corresponding to the determined time difference; and
   tenth means for adjusting the time and operating speed of said secondary timepiece in accordance with said further time differential signal.

3. A method for automatically setting and adjusting the time of a timepiece in conjunction with a telephone standard time annunciation station which, when dialed, provides a voice signal announcing an approaching time and an audible tone designating that time at the proper instant, said method comprising the steps of:
   automatically dialing said standard time annunciation system at a prescribed time;
   separating voice signal from said audible tone when received on said telephone line;
   analyzing the received voice signal from the standard time annunciation station to determine the announced time;
   counting time in synchronism with said timepiece and providing a time signal representing the time registered at said timepiece;
   determining the time difference between the determined announced time and the time represented by said time signal and providing a time differential signal corresponding to the determined time difference;
   adjusting the time and operating speed of said timepiece in accordance with the time differential signal; and
   determining said prescribed time in response to said time differential signal.

4. The method according to claim 3 further comprising the steps of:
   counting time in synchronism with a secondary timepiece and providing a further time signal representing the time registered at said further timepiece;
   determining the time difference between the determined announced time and the time represented by said further time signal and providing a further time differential signal corresponding to that determined time difference; and
   adjusting the time and operating speed of the secondary timepiece in accordance with the further time differential signal.

* * * * *